July 30, 1935.  J. BIJUR  2,009,429
CENTRALIZED LUBRICATION
Filed April 26, 1929    4 Sheets-Sheet 1

INVENTOR
Joseph Bijur
BY
Dean, Fairbank, Obrieght & Hirsch
ATTORNEYS

July 30, 1935.　　　　　J. BIJUR　　　　　2,009,429
CENTRALIZED LUBRICATION
Filed April 26, 1929　　　4 Sheets-Sheet 3

INVENTOR
Joseph Bijur
BY
ATTORNEYS

Patented July 30, 1935

2,009,429

UNITED STATES PATENT OFFICE 2,009,429

CENTRALIZED LUBRICATION

Joseph Bijur, New York, N. Y., assignor to Auto Research Corporation, a corporation of Delaware Application April 26, 1929, Serial No. 358,221

58 Claims. (Cl. 184—7)

My present invention though applicable in other relations is exemplified in the lubrication of the bearings on a motor vehicle steering axle embodying brakes of the axle post type.

It is an object of the invention to provide an arrangement for supplying the desired amounts of lubricant from a common inlet at the axle to various bearings of or on the axle end that require lubrication, and more particularly an arrangement in which said inlet may be a drip plug or other flow controlling outlet of a centralized pressure lubricating system from which various bearings on the chassis are lubricated concurrently with the axle, all from a common source.

Another object is to provide a construction of the above type devoid of swinging or flapping conduits apt to whip or break, or of swivels apt to loosen or jam or of protuberances apt to be injured or broken off in traffic.

Another object is to provide a construction in which the above results are accomplished by the mere provision of fittings, bores, and conduits easily applied to axle, knuckle or brake constructions as conventionally used, and without further modification thereof.

Another object is to provide an arrangement of the above type in which the leak or loss of oil at a loose bearing or joint is obviated and water and dirt are excluded from the path of lubricant flow.

Other objects will be in part obvious during the course of the following specification and will be in part pointed out therein.

While the lubricant may be supplied in any manner it is preferably supplied from one of various drip plugs or other flow controlling outlets of a centralized lubricating system of the intermittent or shot feed type such as specifically disclosed in the drawings of my prior Patent 1,632,771 of June 14, 1927. The present invention provides a more general solution for reliably delivering and distributing the lubricant even from a continuous feed system such as is shown in Patents Nos. 1,732,212 and 1,746,139 to various bearings on a pivoted or swivelled part.

To supply the small amounts of lubricant required by an automobile chassis and no great excess thereof, under continuous feed throughout running of the vehicle, the delivery must be at extremely slow rate. At such slow rate of feed, (as distinguished from the more rapid shot feed) lubricant reaching even a slight draining crevice in its course of flow might leak therethrough and never reach the bearings.

By the present invention, the lubricant for a steering knuckle or other movable structure is delivered from a drip plug or from another flow metering device, through restricted or substantially filled bores in the axle, king pin or other fixed structure extending to a relatively elevated part thereof, from which the lubricant proceeds and divides by gravity flow. The entry to the king pin or other fixed mount for the moving structure takes place across the tightened or loaded surface of contact thereof with the axle or other mount.

In the lubrication of motor vehicle steering axles, embodying brakes of the axle post type, it is a feature to admit the lubricant at a part fixed with respect to the axle and to divide the lubricant for delivery therefrom to the respective keyed pivot mounts of the knuckle and of the brake lever, by entry thereto at parts firmly pressed against the axle. Restrictions or obstructions are provided for the respective dividing conduits to proportion or divide the lubricant between the knuckle pivot and the brake pivot.

In a preferred embodiment to this end the axle web is provided with a longitudinal bore therein connecting the knuckle and the brake pivot pin. The inlet fitting communicates with said bore at a part between the ends thereof and the bore preferably has a restriction pin therein which determines the division of lubricant to the respective pivot mounts. The bore in the axle may be arranged to feed into the respective mounts at the sides thereof diametrically opposite the lock keys where, or in the alternative, in one or both cases the lubricant may be fed transversely into and through the lock keys both sides of which are under pressure or load.

The division of lubricant after admission to the king pin or knuckle, may be accomplished according to the teachings of my prior British Patent No. 254,655 or in any equivalent manner. The king pin may be provided with a longitudinal upstanding bore filled with oil, so that lubricant readily reaches the top thereof, and dividing conduits may drain from the top to the various knuckle bearings directly, or by way of the bearing of the brake cam stub shaft which would thus be lubricated in transit. The king pin may also be provided with an overflow passage from the top to deliver downward to the lower king pin bearing.

In another embodiment separate drip plugs may be employed one to feed into the king pin and the other to the brake post. These drip plugs may be supplied from a dividing T fitting, the stem of which constitutes the common inlet therefor. In a specific embodiment one of the drip plugs may serve as the support for the T dividing fitting, a pipe leading from the other end of the T arm to the other drip plug.

In a preferred construction the supporting drip plug feeds into the king pin and the conduit feeds into the upper end of the brake post. Excess lubricant from the brake post may be drained through an oblique bore near the lower part of the bearing thereof downward to the lower bearing of the king pin.

In the accompanying drawings in which are shown one or more of various possible embodiments of the several features of this invention.

Referring now to Figs. 1 to 4 of the drawings the brake post type axle 10 there shown has a king pin 11 through the eye thereof affixed in place by a transverse lock key 12. The axle is sustained upon a thrust bearing 13 illustratively a ball bearing resting on the lower clevis 14 of the steering knuckle 15, which clevis pivots on the lower end of the king pin, the upper end of which provides a corresponding bearing for the upper jaw 16 of the knuckle clevis. The steering knuckle illustratively has a tie rod arm 17 and (in the left-hand knuckle illustratively shown) also a drag link bearing arm 18. The knuckle is also provided with a brake shield 19 having a bearing 20 thereon through which extends the stub shaft 21 of the brake cam (not shown).

Near the king pin and preferably parallel thereto is a brake post or pivot pin 22 affixed in the axle by means of a lock key 23, the upper end thereof affording a bearing for the hub 24 of a brake lever 25. The outer end of the brake lever has a ball bearing in a socket 27 at the end of a rod 28 affixed at its opposite end to an arm 29 on brake rock shaft 21. The construction thus far described taken by itself is already known and not my invention.

Figure 1:
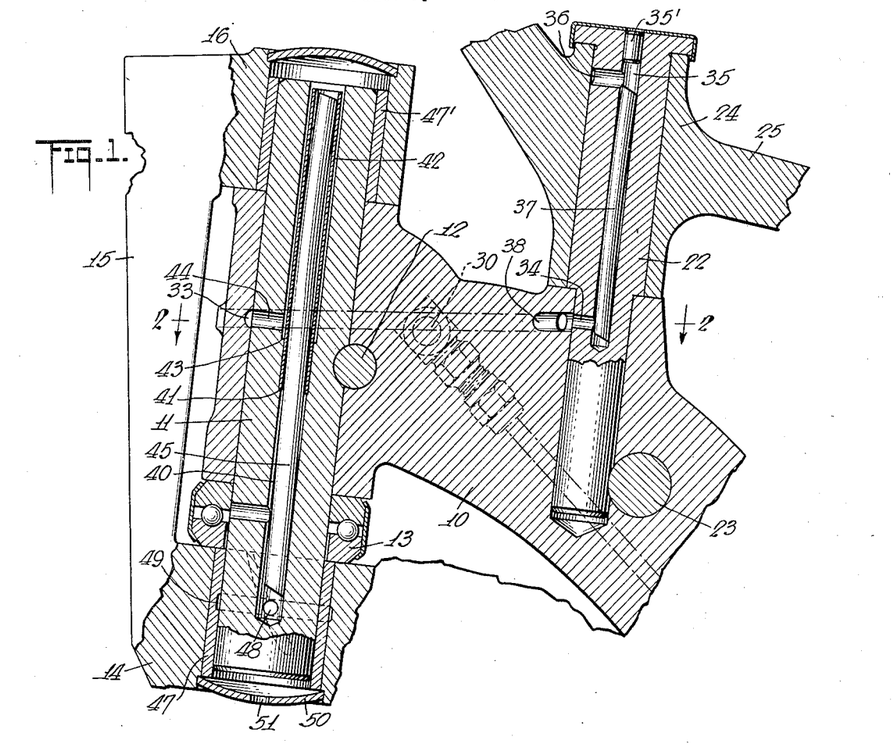
Fig. 1 is a fragmentary view of an axle, showing parts in longitudinal cross-section.
Figure 2:
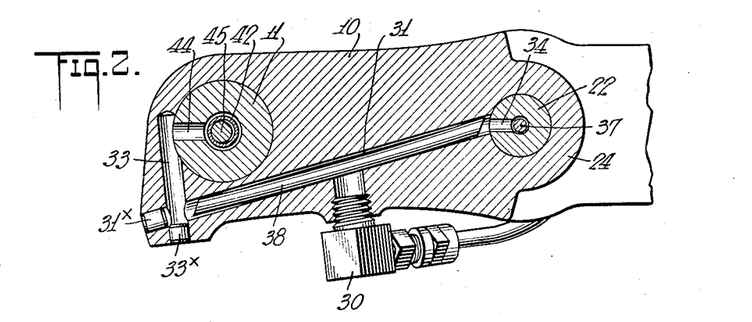
Fig. 2 is a transverse sectional view taken on line 2—2 of Fig. 1.

In the embodiment of Figs. 1 to 4 the lubricant is admitted to the axle end through an appropriate inlet preferably a drip plug 30 supplied from a central lubricating system concurrently with other drip plugs which feed other parts or bearings. The drip plug communicates with a bore 31 generally longitudinally of the axle web 10 and delivering at its opposite ends respectively to the king pin 11 and to the brake post 22. To avoid leak or loss of lubricant in transit from the axle, admission is effected at a loaded or tightened part of the respective pin and post. Thus as shown in Figs. 1 and 2 the end of bore 31 feeds into pin 11 from diametrically opposite the lock key 12, at which region the pin is tightly wedged against the axle. The loaded surface of the king pin in the specific embodiment shown being at the outermost part, the bore 31 extends obliquely and laterally of the king pin, and connects with a short bore 33 at an angle thereto, which extends tangentially of the loaded side of the king pin. The extremities of the bores 31 and 33 are plugged respectively at 31$^x$ and 33$^x$ to form the L shaped conduit shown.

The brake post as shown is preferably provided with a radial bore 34 communicating with the extremity of the axle bore 31, bore 34 in turn communicating with an axial bore 35 from the upper end of the brake post and plugged at its outer end as at 35'. A radial bore 36 near the upper end of said bore 35 delivers lubricant therefrom to the upper end of the encircling hub 24 of the brake lever. In order to facilitate the climbing or rise of lubricant from the radial bore 34 to the brake post bearing, the bore 35 is substantially filled with a pin or rod 37 bent to remain in place. The lubricant escaping through bore 36 to the hub bearing 24, of course spreads downward to lubricate the entire length of said bearing.

To determine the division of lubricant from the common inlet fitting 30 to the king pin 11 and brake post 22 respectively, flow dividing and proportioning means is provided, in this instance illustratively a rod or pin 38 nearly filling the longitudinal bore in the axle. The division of lubricant will accordingly take place in proportions varying inversely with the resistance of the respective courses at the opposite sides of the drip plug 30. The resistance of the outlet between bore 36 and hub 34 restricts emission to the brake post so that the latter receives considerably less lubricant than does the king pin which of course requires more lubricant. If required the length of bore 31 between drip plug 30 and king pin 11 may be of larger diameter than the rest of its length to increase still further the proportion of lubricant to the king pin.

Figures 3, 4:
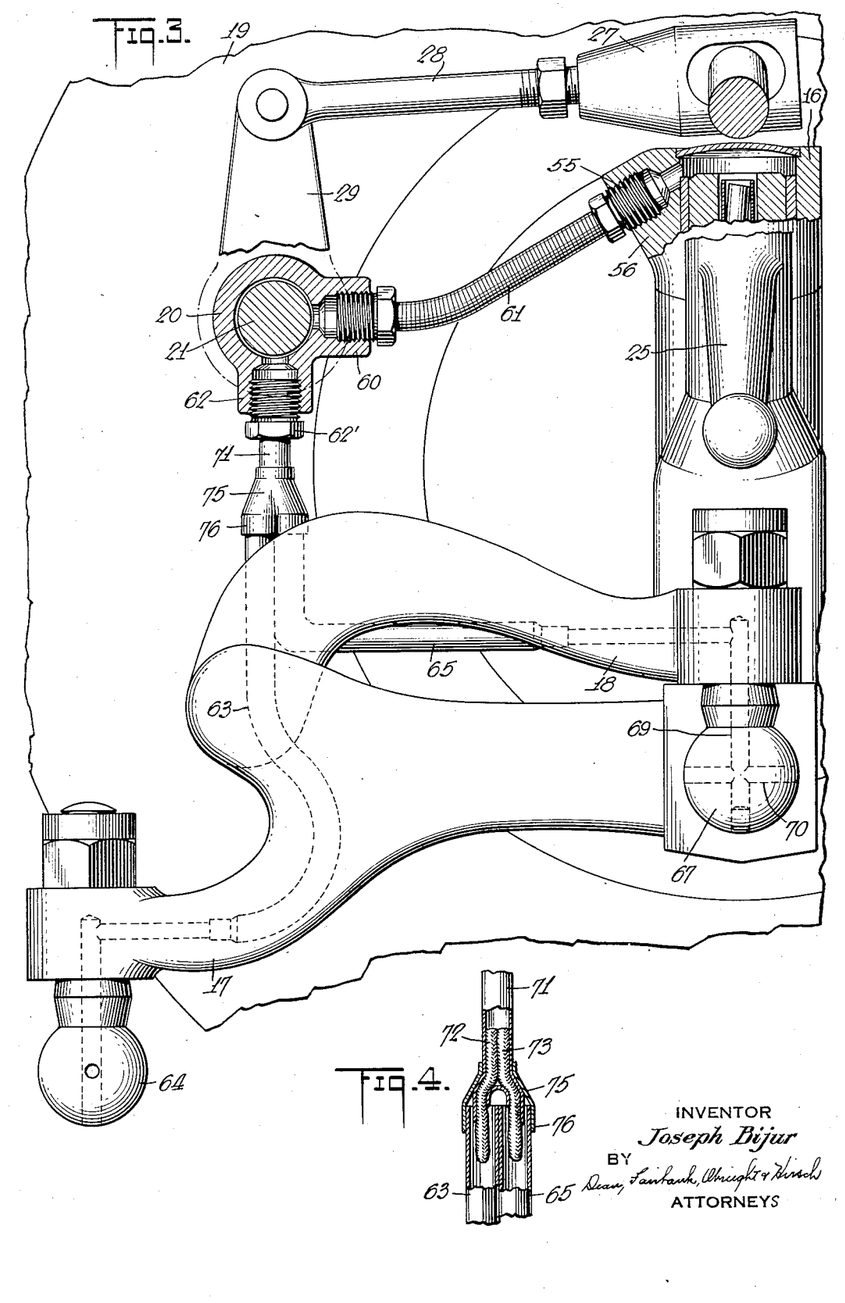
Fig. 3 is an elevation partly in section showing one arrangement for supplying lubricant to the knuckle bearings.
Fig. 4 is a sectional view of a detail of Fig. 3.

The lubricant entering the king pin from tangential bore 33 may be delivered to such of the knuckle bearings as it is desired to lubricate therefrom, or to all of such bearings, according to any of various possible arrangements, illustratively according to that for instance of Fig. 4 of my prior British Patent No. 254,655.

In the present embodiment the king pin 11 is shown with an axial bore 40 of substantial diameter ¼" or more, extending downward from the upper end to near the lower end thereof. The bore 40 has a step or shoulder 41 at which is bottomed a thin walled tube 42 extending up to near the top of the king pin and the bore has another step or shoulder 43 determining a narrow cylindrical jacket or space within the king pin and at the exterior of the tube 42. The step 43 is just below the tangential bore 33 from which a radial bore 44 in the king pin feeds lubricant to the jacket.

The tube 43 and the length of king pin bore 40 therebelow are nearly filled with a rod or pin 45 extending substantially the length thereof. The lower bearing or bushing 47 is supplied with oil from the lower extremity of the bore 40 below the filling rod and below the upper end of the pivot bearing 47, air escaping by displacement upward along said bushing. Several radial bores 48 through the king pin extend outward to the bushing 47 which has a groove 49 to accommodate and spread the lubricant along the bearing surface thereof. The sealing plug 50 at the lower extremity of the lower bushing 47, has a central aperture 51 further to preclude air blocking.

In the knuckle construction as thus far described lubricant fed through radial bore 44 fills the cylindrical jacket about tube 42 and overflows over the top thereof. A small part of the lubricant passes through the restricted passage between the tube 42 and the pin 45 downward to the lower bearing to lubricate the latter. The rest of the lubricant overflows from the cylindrical jacket outward to the upper king pin bushing 47', from which excess is in turn drained outward to supply the other bearings of the knuckle such as the tie rod, drag link, brake cam and any other bearings generically designated "knuckle control" bearings.

In the embodiment illustrated in Figs. 1 to 4 the overflow from the king pin occurs through an outlet fitting 55 in a boss 56 on the upper knuckle clevis jaw 16. In that embodiment the lubricant is conveyed in the first instance to the brake cam rock shaft bearing 21 from which in turn lubricant is passed by overflow or drainage to the tie rod bearing, the drag link bearing or both.

The fixed cam stub shaft bearing 20 has a lateral inlet socket 60 to which the lubricant is conveyed from outlet 55 by a connecting outlet conduit 61 which for convenience of installation is flexible. The bearing has a lower outlet or draining socket 62 from which lubricant that has wet the bearing surface thereof is drained onward to the tie rod or to both the tie rod and drag link bearings. The division of lubricant to the latter bearings may be effected according to the teachings of my British patent above identified in order to avoid air blocking, or siphoning from a higher to a lower bearing or other cause for inaccuracy of division.

In the specific embodiment shown the dividing means comprises a metal pipe length 63 extending generally along the tie rod bearing to the corresponding ball stud 64 and a metal pipe length 65 extending generally along the drag link bearing to the corresponding ball stud 67. To each bearing emission is effected through a system comprising a longitudinal bore 69 and radial bores 70 as shown. The upper ends of the pipes 63 and 65 extend vertically in contiguity to each other, and lubricant is admitted to both of them through a single feed pipe 71 from the drain socket 62. The division from the feed pipe to the two dividing pipes 63 and 65 is in this embodiment effected by a pair of wicks 72 and 73 the upper ends of which are tightened in pipe 71, the lower ends of which extend into the upper ends of the respective pipes 63 and 65. To maintain the pipes assembled a coupling piece 75 is soldered at its neck about feed pipe 71 and at its bifurcated belled or lower end 76 about the two upstanding dividing pipe ends. The feed pipe 71 and the dividing pipes 63 and 65 may be a preassembled unit and are readily installed upon the knuckle by applying the upper end of feed pipe 71 to socket 62 by means of nut 62' and extending the pipes 63 and 65 along the respective arms and lashing them thereto and applying the extremities thereof to the respective ball studs. The main length of feed pipe 71 and the upper lengths of the pipes 63 and 65 are of fairly large bore to allow air and oil to pass about each other, thus precluding siphoning or air blocking.

The lubricant passing through conduit 61 will first lubricate brake bearing 20 and then cascade into feed pipe 71, the slow feed from which drips upon both of the contiguous upper wick ends 72 and 73. The wicks control the desired division, the drippings therefrom passing respectively to the tie rod and drag link bearings.

Obviously if it is desired not to lubricate the rock stub shaft for the brake cam, from the distributing system, feed pipe 71 would be connected directly from the outlet 55 to the dividing coupling 75 as in my British patent.

Especially in a continuous feed system it is desirable to fill all of the voids with lubricant before putting the system into service, so that the delay in supplying the small amount of lubricant necessary to fill the various rising passages before overflow could occur, is obviated.

Figure 5:
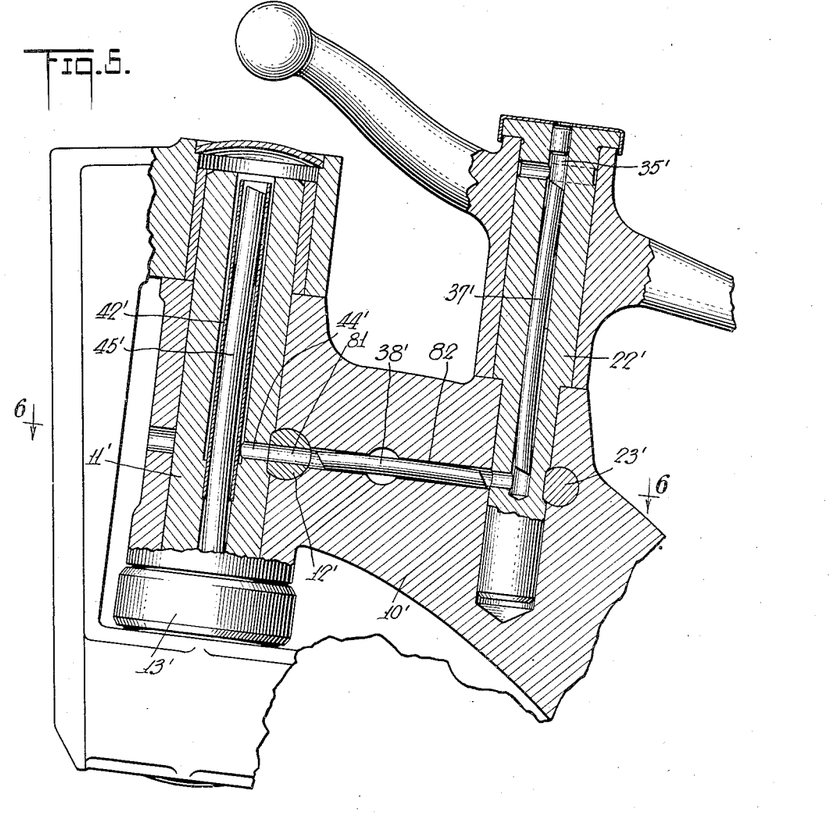
Fig. 5 is a view in longitudinal cross-section of a modification.
Figure 6:
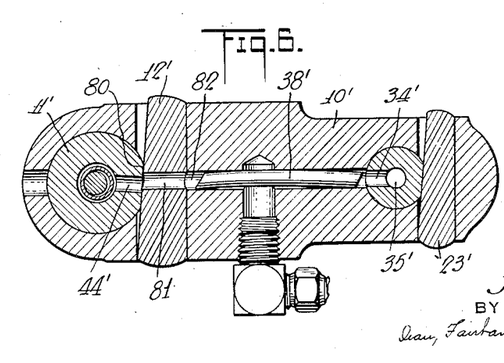
Fig. 6 is a transverse sectional view taken on line 6—6 of Fig. 5.

In Figs. 5 and 6 is shown a modification in the axle construction for admission of lubricant to the king pin. Instead of feeding the lubricant about the king pin to the loaded side thereof as in Figs. 1 and 2, admission is effected directly into the king pin 11' by way of the lock key 12' both sides of which are of course wedged and therefore lubricant tight. As shown in Figs. 5 and 6 the oblique wedged side of the locking pin 12' contacts a flat 80 on the king pin, and the bore 82 in the axle registers with transverse bore 81 in the lock key 12' which in turn registers with radial bore 44' in the king pin. The lock keys are at the same level as the lubricant inlets to the respective king pin and brake post, thereby providing a particularly tight lubricant inlet thereto. The construction is otherwise the same as that of Figs. 1 and 2 and need therefore not be described more fully. Corresponding parts are designated by the same numerals primed in Figs. 5 and 6.

Figures 7, 8:
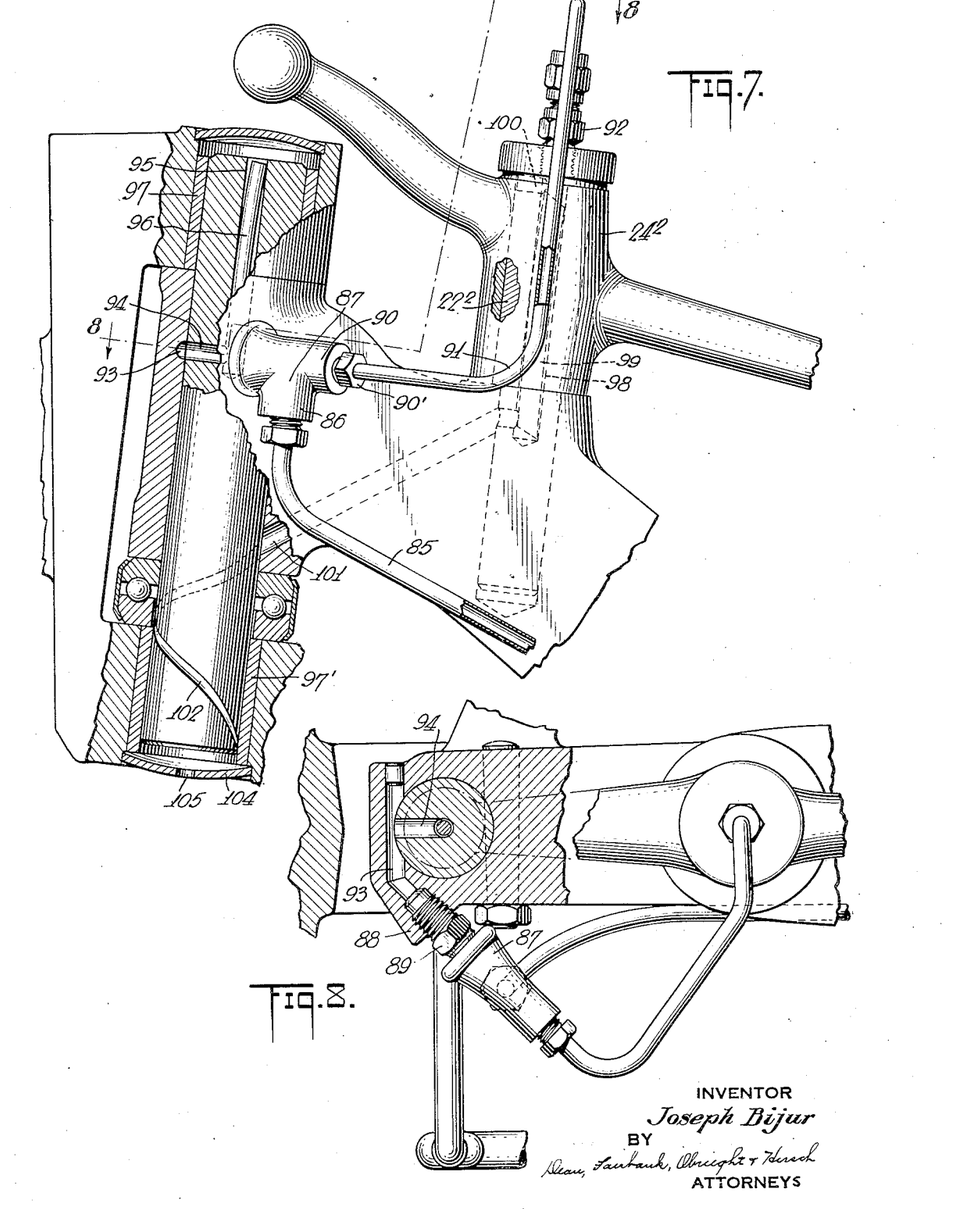
Fig. 7 is a fragmentary view similar to Fig. 1 of an alternative embodiment.
Fig. 8 is a fragmentary sectional view taken on line 8—8 of Fig. 7.

In the embodiment of Figs. 7 and 8 the lubricant is shown supplied from a conduit 85 along the axle and delivering into the stem 86 of a T fitting 87. The T fitting is connected to a boss 88 on the axle by means of a drip plug 89 which controls the entry of lubricant to the knuckle and in addition serves as the mount for the T fitting 87. The other arm 90 of the T fitting is connected by terminal 90' to a pipe 91 the extremity of which is affixed to the upper end of the brake post 22² by means of a drip plug 92 which controls the admission of lubricant to the latter.

The lubricant from the drip plug 89 is admitted to the king pin preferably as in the embodiment of Fig. 1 by way of a bore 93 tangential of the loaded or wedged side of said king pin, the king pin having a radial bore 94 for admission thereinto. In the illustrative embodiment shown, the king pin is bored only at its upper part 95 while the main or lower part of the length thereof is imperforate. The lubricant rises in bore 95 the effective volume of which is reduced preferably by a filling pin 96 retained therein by bending as shown, and overflow from the upper end of the bore to bushing 97 to the tie rod, drag link or other bearings on the knuckle may be accomplished as in the embodiment of Fig. 3 and is therefore not here shown.

The lubricant admitted to the brake post 22² through drip plug 92 passes on into an axial bore 98 which preferably is nearly filled with a rod 99. From the upper end of bore 98 lubricant passes outward through radial bore 100 to the upper part of the brake lever hub 24² which is thus lubricated. In this embodiment the lower king pin bearing is lubricated by drainage from the lower part of bore 98 in the brake post by way of an oblique bore 101 through the axle web. Bore 101 communicates with the king pin at the unloaded side thereof from which the lubricant naturally drains downward along the king pin to the lower bushing 97' thereof. A helical groove 102 may be provided about the lower end of the king pin for facilitating the spread of lubricant about the bushing 97'. The lower closure plug 104 of the lower king pin bearing is preferably apertured as at 105 to prevent air blocking.

It is to be understood that there may be many changes and modifications made in the construction and the arrangement of the details of my invention without departing from the scope thereof, and I intend to include all such variations as fall within the scope of the appended claims in this application, in which only the preferred forms of my invention have been disclosed.

The invention of the present application is applicable to mechanisms other than those associated with an automotive vehicle, generally containing two adjacent bearings, both of which are preferably connected to or attached to the same support. It is to be understood that the invention of the present application is also applicable to spindle and steering knuckle constructions other than those which are supported from an axle, and that the expression "brake post" utilized in the accompanying claims includes other brake pivot support members associated with the brake actuating mechanism.

As shown in the present application the king pin is fixed in the supporting member resiliently connected to the frame, but it is to be understood that such king pin may be fixed in respect to other members or may be constituted other than as a single element as shown.

I claim:

1. A motor vehicle of the type having a knuckle, a king pin therefor, a brake post near said king pin and a brake operating lever pivoted upon said post; a lubricant inlet carried by a part of the vehicle and conduit means extending from said inlet and delivering to the king pin and to the brake post.

2. Means for lubricating a king pin and a brake post; said means including a lubricant inlet and a passageway establishing communication from said inlet with the bearing surface of said king pin and said brake post.

3. In a motor vehicle of the type including a knuckle having a king pin pivot, a brake post near said knuckle, and a brake lever having a bearing on said post; the combination therewith of a lubricant inlet near said knuckle, distributing conduit means supplied from said inlet and leading to both the bearing of said knuckle and the bearing of said brake post, and means governing the division of the lubricant to the respective bearings.

4. In a motor vehicle of the type including a knuckle, a brake lever post near said knuckle, a brake lever having a bearing on said post, a lubricant inlet fitting contiguous to said knuckle, passageways leading from said inlet respectively to the pivot bearing surface of said knuckle and to the bearing surface of said brake post, and flow restriction means proportioning the division of lubricant to the respective bearings.

5. In a vehicle of the type including a knuckle having a king pin pivot, a brake post near said knuckle, and a brake lever having a bearing on said post; the combination therewith of a lubricant inlet between the king pin and the brake post, a bore leading respectively to said king pin and to said brake post and in communication with the bearing surfaces of the latter, the segments of said bore being proportioned to determine the division of lubricant from said inlet to the respective bearings.

6. In a motor vehicle of the type including a knuckle having a king pin pivot, a brake post near said knuckle, a brake lever having a bearing on said post; the combination therewith of a lubricant inlet between said pin and said post, a bore in communication at one end with the king pin and at the other with the brake post, said aforementioned inlet delivering into the bore at a point between the ends thereof and flow restriction means in said bore determining the division of lubricant respectively to the pin and the post.

7. In a motor vehicle of the type comprising a pivoted steering knuckle, a brake post near said pivot, and transverse pins retaining the knuckle pivot and the brake post in position, each determining a loaded and an unloaded contact area, said post presenting a protruding length forming a pivot for the brake lever; the combination therewith of means for delivering lubricant to the pivot and to the brake post, said means comprising a bore communicating at one end through the loaded contact area with the pivot bearing of the knuckle and at the other end through the loaded contact area with the brake post and a lubricant inlet in said axle communicating with said bore between the ends thereof.

8. In a lubricated mechanism, the combination of a structure part, a pivot member therein, a transverse key locking said pivot member in place and means for supplying lubricant to a bearing surface of said pivot member, said means comprising a lubricant inlet in said structure part at the side of said key and said structure part having a passage therealong leading from said inlet to the side of said pivot member substantially opposite said key.

9. In a lubricated mechanism the combination of a structure part, a pivot post therein, a transverse key affixing said post in place and a lubricant inlet in said structure part at the side of said post opposite said key, said structure part having a bore therein leading into said post through the loaded face thereof substantially opposite said key.

10. In a lubricated structure, a pivot post therein, a transverse key affixing said post, a lubricant inlet in said structure at the side thereof adjacent said key and a bore in said structure having a first segment extending laterally of said post and a second segment at an angle thereto and through the loaded surface of said post opposite said key.

11. In a vehicle of the type having a king pin keyed thereinto, a brake post near said king pin, said brake post having a protruding bearing length for a brake lever; the combination therewith of means for delivering lubricant into said king pin and into said brake post, said means comprising a bore system consisting in part of a bore between said pin and said post, said system communicating at one end with the loaded side of the king pin diametrically opposite the lock key therefor, and communicating at the other end with the loaded surface of the brake pivot opposite the lock key therefor, a lubricant inlet between said pin and said post and communicating with said bore between the ends of the latter, and means for proportioning the division of lubricant through the ends of said bore to the respective bearings.

12. In a mechanical structure of the type including a pair of mechanisms thereon, each having a pivot mount affixed in said structure, means for lubricating the respective mechanisms, said means comprising a single inlet fitting in said structure near one of said pivot mounts and a bore through said structure communicating from said inlet to the respective pivot mounts, means for controlling the division of lubricant from the inlet through the respective mounts and means associated with the respective mechanisms for controlling the division of lubricant to the respective bearings thereof.

13. A mechanical structure of the type having a pair of adjacent mechanisms thereon, each having a pivot mount affixed in said structure, means locking said mounts in place and pressing or loading the surface thereof against the structure, an inlet between said pivot mounts, conduit means leading from said inlet to the respective mechanisms, the transmission of lubricant between the support structure and the respective pivot mounts being across the loaded surfaces thereof.

14. In a motor vehicle axle of the type having a fixed king pin, a knuckle provided with bearings pivoted thereon and a fixed brake post near said king pin; the combination therewith of means for lubricating said knuckle bearings and said brake post, said means comprising a lubricant inlet near said post, means feeding lubricant from said inlet into said king pin, means conveying lubricant from said king pin to the knuckle bearings, means feeding lubricant from said inlet into said brake post, and means proportioning the flow of lubricant from said inlet to the king pin and to the brake post respectively.

15. In a motor vehicle comprising a fixed king pin, a steering knuckle thereon, brake mechanism including a brake post and having an upstanding bearing for a lever arm; means for lubricating said brake post and the various bearings of said knuckle from a common source, said means comprising a lubricant inlet fitting between the king pin and the brake post, a flow controlling passage from said fitting communicating at one end with the king pin and at the other with the brake post, said conduit comprising a bore registering at its ends respectively with an inlet in the king pin and an inlet in the brake post, said king pin having a passageway feeding admitted lubricant upward therefrom and means for dividing and conveying the lubricant from the upper end of the king pin to various bearings on the knuckle.

16. A motor vehicle having a king pin fixed therein, a brake post fixed therein, said king pin and said brake post having longitudinal lubricant conveying passages therein of small effective lubricant containing volume, a longitudinal passage communicating at its ends respectively with the longitudinal passages of said king pin and said brake post, a lubricant inlet communicating with said first passage, and flow restriction means in said first passage governing the division of lubricant from said inlet respectively to the king pin and to the brake post.

17. In a motor vehicle, the combination of a king pin, a transverse locking key, a lubricant inlet near said locking key and means for delivering lubricant from said inlet to said king pin, said means comprising a bore and continuing transversely through the locking key and into said king pin.

18. In a motor vehicle, a king pin, and a brake post therein, transverse locking keys securing said members in position, a lubricant inlet fitting between said king pin and said brake post, a longitudinal bore, said bore extending transversely through one of said locking keys into the corresponding locked member and extending into the other of said locked members at the side thereof opposite its locking key.

19. In a vehicle of the type having a fixed king pin therein, means for feeding lubricant transversely into said king pin, said king pin having a longitudinal bore, a tube affixed in said bore and affording clearance above said lubricant inlet, and a restriction filler within said tube affording a restricted passage leading to the lower end of said king pin.

20. In a steering knuckle having a pair of control bearings, means for dividing lubricant between said bearings, said means including a pair of conduits leading to the respective control bearings and means dividing the lubricant between said conduits the upper ends of said conduits being contiguous and substantially vertical, means feeding lubricant to said conduits, said means comprising a pair of wicks retained adjacent each other at their upper ends and drooping into the upper ends of the respective conduits.

21. A lubricant distributor to supply the tie rod and drag link bearings of a steering knuckle, said distributor having an inlet for application near the upper end of the knuckle, a supply pipe extending downward therefrom, a pair of dividing pipes leading to the respective tie rod and drag link bearings and extending parallel and contiguous to each other at their upper ends, a coupling piece retaining the lower end of said supply pipe and the upper ends of said dividing pipes in registry with each other, and a pair of short wicks clamped at their upper ends into the lower end of said supply pipe and drooping into the upper ends of the respective dividing pipes.

22. A steering knuckle of the type having a king pin pivot mount, a control bearing, a brake shield, a brake rock shaft through said shield, having a bearing fixed at said shield, means for feeding lubricant to the respective bearings, said means comprising a lubricant delivery fitting near the upper end of said king pin, a conduit leading from the latter to said brake shaft bearing, a drain outlet near the lower part of said bearing and a conduit connected from the latter to the control bearing.

23. A vehicle of the type comprising a king pin, a steering knuckle thereon having a tie rod and a drag link bearing, a brake shield, a brake cam stub shaft therethrough having a bearing above the tie rod and drag link; the combination therewith of means for lubricating said various bearings, said means comprising a lubricant inlet, means conveying lubricant from said inlet to the upper end of said knuckle, a conduit along said knuckle extending from said upper end to a part of said brake shaft bearing, an outlet from said bearing draining from the bearing surface thereof, a dividing fitting supplied from said outlet, and conduits extending along the knuckle delivering from the respective branches of said dividing fitting to the tie rod and drag link bearings.

24. In a vehicle of the type comprising a knuckle having a pivot mount, a brake post affixed near said pivot mount, means for supplying lubricant to the upper bearing of said knuckle and to said brake post, said means comprising a lubricant inlet, dividing conduits one leading from said inlet to the upper part of the knuckle pivot bearing, the other leading to the bearing surface of the brake post, said axle having a bore draining from said brake post to the lower part of the knuckle pivot bearing.

25. In a vehicle of the type including a king pin, a knuckle having an upper and lower pivot bearing on the corresponding ends of said king pin, a brake post rigidly affixed in said axle near said king pin and having a protruding upper bearing end; the combination therewith of means for feeding lubricant to the respective king pin and brake post bearings, said means comprising an inlet fitting, means feeding lubricant from said inlet to the upper king pin bearing, means feeding lubricant from said inlet to the brake post bearing, said means having associated obstructions for proportioning the oil therebetween, and a bore extending obliquely through said axle from the lower part of said brake post bearing to the lower king pin bearing to drain lubricant from the former to supply the latter.

26. In a vehicle of the type including a king pin rigidly affixed therein, a knuckle having an upper and a lower pivot bearing on the corresponding ends of said king pin, a brake post near said king pin and having a protruding upper bearing end; the combination therewith of an inlet fitting communicating with the king pin, a conduit from said fitting leading upward into the upper end of the brake post and passageways in said brake post delivering lubricant to the bearing surface thereof.

27. In a vehicle of the type including a king pin rigidly affixed therein, a knuckle having an upper and a lower pivot bearing on the corresponding ends of said king pin, a brake post near said king pin, and having a protruding upper bearing end; the combination therewith of a lubricant inlet fitting having dividing branches, conduit means leading from said branches respectively laterally into one of said pins and through the upper end of the other of said pins and restriction devices near the respective pins for proportioning the division of lubricant therebetween from the common inlet.

28. A vehicle of the type including a king pin rigidly affixed therein, a knuckle having an upper and a lower pivot bearing on the corresponding protruding ends of said king pin, a brake post near said king pin and having a protruding upper bearing end; the combination therewith of a dividing T fitting having an inlet in its stem, a supporting restriction fitting secured to one of the arm outlets of said T fitting, bores leading lubricant from said supporting fitting to the king pin bearing, a second restriction fitting in the end of the brake post, a conduit connecting the other arm of said T fitting with said latter fitting and passageways in said brake post delivering lubricant from said second restriction fitting to the bearing surface thereof.

29. In a centralized system for lubricating various bearings of a swiveled device on a main structure, the combination of an inlet in said main structure to supply all of said bearings, a restricted flow passage supplied from said inlet and leading along said main structure to an elevated part of said swiveled device, and gravity feed conduits carried by said swiveled device and leading from said elevated part to the various bearings, said restricted flow passage being formed in a substantially vertical bore in the main structure and consisting of an annular chamber formed between the wall of the bore and a standpipe inserted in said bore, said inlet feeding the bottom of said annular chamber and said annular chamber being closed below said inlet so as to cause all lubricant from said inlet to flow upwardly therethrough to said elevated part.

30. In a vehicle having a pivot member, a device pivoted thereon, and having a bearing; the combination therewith of a lubricant inlet adjacent said pivot member, continuous passageways extending from said inlet through the structure of the pivot member to substantially the upper end of said pivot member, said passageways affording a restricted course for the lubricant from said inlet, and means for conveying the lubricant by gravity from the upper end of the pivot member to the bearing of the device pivoted thereon.

31. In a vehicle having a fixed king pin pivot member, a knuckle pivoted thereon, a fixed brake post pivot member and a brake lever pivoted on the latter; the combination therewith of a lubricant inlet adjacent said king pin and said brake post, passageways extending from said inlet through the structure of the pivot members to substantially the upper ends of said king pin and said brake post, said passageways affording a restricted flow controlling dividing course for the lubricant from said inlet, and means for conveying the lubricant by gravity from said upper ends to the bearings of the respective pivoted members.

32. A lubricant distributing system comprising a branch conduit system in which the branches are axially aligned and in which the main conduit leading thereto is at an angle to the branches and a filler pin placed in said aligned branches and extending upon either side of the place of junction with the main conduit, the length of the pin on either side of the place of junction being so regulated as to assure a proper division of lubricant between the branches.

33. A lubricated king pin construction including elements of the upper and lower king pin bearings and a thrust bearing, said construction comprising an axial bore through the king pin, a standpipe in the upper portion of said bore spaced from the walls of said bore and forming an annular chamber, the lower end of said standpipe closely fitting said bore to prevent lubricant from flowing downwardly between the bore and the standpipe, a radial inlet bore extending from the outside of the king pin to the bottom of said annular chamber and radial outlet passages below said annular chamber, said radial outlet passages being supplied from the interior of the standpipe and adapted to supply the thrust bearing and the lower king pin bearing, said construction including means to supply lubricant to said inlet bore, lubricant being supplied to the interior of said standpipe from said annular chamber.

34. A lubricated steering knuckle arrangement comprising an eye, a king pin keyed therein and extending above and below said axle eye, a clevis jaw steering knuckle encircling and extending beyond the protruding ends of the king pin and caps enclosing the open lower and upper portions of the clevis structure, the lower of said caps being provided with an opening to the atmosphere, said king pin being provided with an inlet and with a bore therethrough feeding lubricant to the lower portion thereof encircled by the clevis jaw, said opening in the lower cap permitting venting so as to assure flow of lubricant downwardly through the bearing surface between the lower end of the king pin and the lower encircling part of the clevis.

35. In a motor vehicle, a king pin, a knuckle pivoted upon the king pin and carrying a knuckle control bearing, a brake post, a brake lever hub pivoted upon said brake post, a brake cam stud shaft bearing on said knuckle, a conduit system for supplying lubricant to the brake post and king pin in parallel and another conduit system for receiving part of the lubricant supplied to the king pin and supplying it in series to the brake cam stub shaft bearing and to the knuckle control bearing.

36. In a motor vehicle, an eye, a king pin keyed within said eye and provided with a bearing portion projecting above and below the eye, an axial bore in said king pin, an inlet to said axial bore at the axle eye, a chamber at the top of said king pin adapted to receive lubricant from said axial bore, a brake control mechanism having a bearing on said knuckle and a conduit from said chamber to said control bearing, the king pin bearing portions being supplied directly from said chamber.

37. A lubricated motor vehicle comprising an eye, a king pin keyed within said eye and having its bearing portions protruding above and below said eye, a clevis jaw steering knuckle encircling the protruding ends of said eye, lubricant receiving chambers above and below said king pin, an axial bore in said king pin, an inlet to said axial bore at the axle eye, said bore being provided with outlets at its upper end to the upper king pin bearing portion and at its lower end to the lower king pin bearing portion, the upper chamber being supplied directly from the axial bore and supplying the upper king pin bearing and said lower chamber being supplied indirectly by the lubricant which has flowed through the lower king pin bearing from the axial bore.

38. In a lubricating system, a support, a spindle bolt mounted in the support, a brake-stud bearing mounted in the support, a lubricant conduit in the spindle bolt, a lubricant conduit in the brake-stud bearing, a third conduit connecting the first-named conduits to form a U-tube, and means for supplying lubricant to the U-tube.

39. In a lubricating system, a support, a spindle bolt mounted in the support, a brake-stud bearing mounted in the support, a lubricant conduit in the spindle bolt, a lubricant conduit in the brake-stud bearing, a third conduit connecting the first-named conduits to form a U-tube, means for supplying lubricant to the U-tube, and an additional bearing supplied with lubricant when the U-tube overflows.

40. In a lubricating system, a support, a tubular spindle bolt mounted in the support, a stand pipe mounted in the tubular spindle bolt and having a portion of less diameter than the interior diameter of the bolt to form an annular chamber, a brake-stud bearing mounted in the support and having a longitudinal lubricant passageway, and a conduit connecting the annular chamber about the stand pipe with the passageway in the brake stud bearing to form a U-tube.

41. A lubricating system comprising a support, a spindle bolt mounted in the support and having upper and lower bearings, a brake-stud bearing mounted on the support, a U-tube structure having its open upper ends terminating adjacent the upper spindle bolt bearing and the brake-stud bearing respectively, means for supplying lubricant to the U-tube structure, and means for supplying lubricant from said U-tube structure to the lower spindle bolt bearing when the former overflows.

42. A motor vehicle having a king pin fixed therein, a brake post fixed therein, said king pin and said brake post having longitudinal lubricant conveying passages therein of small effective lubricant containing volume, a longitudinal passage through said axle communicating at its ends respectively with the longitudinal passages of said king pin and said brake post, a lubricant inlet in said axle communicating with said axle passage, and flow restriction means in said axle passage governing the division of lubricant from said inlet respectively to the king pin and to the brake post, the brake post, the king pin and the axle each having a rod longitudinally of said passages and nearly filling the same.

43. In a motor vehicle, a steering knuckle having a pivot mount including an upper bearing and a lower bearing, a thrust bearing sustaining said axle upon said lower bearing, a bore passing lubricant longitudinally of said pivot mount to said thrust and lower bearing, an inlet at the top of said bore and radial bores from said longitudinal bore respectively at the levels of the thrust and lower bearings and feeding lubricant to the same.

44. A lubricant distributing system for a mechanism comprising a plurality of spaced bearing elements, said installation including a lubricant pressure source, an inlet to receive lubricant from said source, a plurality of bores extending from said inlet to and through said spaced bearing elements to conduct lubricant from said inlet to said bearing elements and cylindrical means substantially filling said bores and serving to control the distribution of lubricant and division thereof to said spaced bearings without causing sufficient restriction to interfere with said distribution.

45. A lubricated king pin construction having an axial bore therethrough extending substantially the entire length thereof and a cylindrical filler pin extending through said axial bore substantially from end to end thereof and substantially restricting the same.

46. In a lubricating system for a structure including a support, a plurality of substantially vertical adjacent pivot pins carried by said support and protruding therefrom and encircling bearing elements on the protruding portions of said pins, the combination of bores through the pivot pins and support forming a U-tube having the open ends of its legs adapted to supply lubricant to respective bearings, and means for supplying lubricant to the U-tube.

47. In a lubricating system for a structure including a support, a plurality of substantially vertical adjacent pivot pins carried by said support and protruding upwardly therefrom and encircling bearing elements on the protruding portions of said pins, the combination of axial bores through the pivot pins and a lower connecting bore through the support forming a conduit structure having its upper ends terminating adjacent respective bearings to supply a lubricant thereto and intermediately provided with an inlet, said bearings being on approximately the same level, and means for supplying lubricant to the structure, said structure having an intermediate portion thereof at a lower level than said upper ends.

48. In a lubricating apparatus for a structure including a support, a plurality of adjacent pivot pins substantially inclined to the horizontal carried by said support and protruding therefrom and encircling bearing elements on the protruding portions of said pins, the combination of bores through the pivot pins and support forming a conduit system having open upper outlets supplying lubricant to respective bearings and intermediately provided with an inlet, means for supplying lubricant to the conduit system and a third bearing at a lower level supplied with lubricant when lubricant overflows said outlets, said system having an intermediate portion at a lower level than said upper outlets.

49. In a lubricating system, the combination with two bearings, of a U-tube having the open ends of its legs adapted to supply lubricant to respective bearings, means for supplying lubricant to the U-tube, a third bearing at a lower level supplied with lubricant when lubricant overflows the U-tube, and an additional bearing supplied with excess lubricant from the third-named bearing.

50. In a lubricating apparatus, two bearings at substantially the same level, a U-tube structure having the upper ends of its legs terminating adjacent respective bearings to maintain a lubricant level, means for supplying lubricant to the U-tube, a third bearing at a lower level supplied with excess lubricant when lubricant overflows the U-tube, and an additional bearing supplied with lubricant from the third named bearing.

51. In a lubricating system, a support, a tubular spindle bolt mounted in the support, a stand pipe mounted in the tubular spindle bolt and having a portion of less diameter than the interior diameter of the bolt to form an annular chamber, a brake-stud bearing mounted in the support and having a longitudinal lubricant passageway, a conduit connecting the annular chamber about the stand pipe with the passageway in the brake-stud bearing to form a U-tube, and means for supplying lubricant to the U-tube.

52. A lubricating system comprising a support, a spindle bolt mounted in the support and having upper and lower bearings, a brake-stud bearing mounted on the support, a U-tube structure having its open upper ends terminating adjacent the upper spindle bolt bearing and the brake-stud bearing respectively, and means for supplying lubricant to the U-tube structure.

53. A lubricating system comprising a support, a spindle bolt mounted in the support and having upper and lower bearings, a brake-stud bearing mounted on the support, a U-tube structure having its open upper ends terminating adjacent the upper spindle bolt bearing and the brake-stud bearing respectively, means for supplying lubricant to the U-tube structure, means for supplying lubricant from said U-tube structure to the lower spindle bolt bearing when the former overflows, a tie rod bearing, and means for supplying lubricant from a spindle bolt bearing to the tie rod bearing when the level in the former exceeds a predetermined point.

54. A lubricating system comprising a support, a spindle bolt mounted in the support and having upper and lower bearings, a brake stud bearing mounted on the support, a U-tube structure having its open upper ends terminating adjacent the upper spindle bolt bearing and the brake stud bearing respectively, means for supplying lubricant to the U-tube structure, means for supplying lubricant from said U-tube structure to the lower spindle bolt bearing when the former overflows, a drag link bearing, and means for supplying lubricant from the upper spindle bolt bearing to the drag link bearing when the U-tube structure overflows.

55. A lubricating system comprising a support, a spindle bolt mounted in the support and having upper and lower bearings, a brake stud bearing mounted on the support, a U-tube structure having its open upper ends terminating adjacent the upper spindle bolt bearing and the brake-stud bearing respectively, means for supplying lubricant to the U-tube structure, means for supplying lubricant from said U-tube structure to the lower spindle bolt bearing when the former overflows, a tie-rod bearing, means for supplying lubricant from a spindle bolt bearing to the tie-rod bearing when the level in the former exceeds a predetermined point, a drag link bearing, and means for supplying lubricant from the upper spindle bolt bearing to the drag link bearing when the U-tube structure overflows.

56. In a lubricating system, a support, a knuckle, a spindle bolt having a bearing in the knuckle and mounted in the support and formed with a recess, a brake stud bearing mounted on the support, a passageway in the support, a tapered plug with a conduit therein, said plug being seated in the recess in the spindle bolt, a lubricant supply passage in the support, means of communication between the supply passage and the conduit in said plug, means of communication between the conduit in the plug and the spindle bolt bearing, and means of communication between the lubricant supply passageway in the support and the brake stud bearing.

57. In a vehicle having a support, a knuckle having a pivot mount on said support, a brake actuating mechanism having a bearing on said knuckle, and a steering actuating bearing externally carried by said knuckle and positioned below the bearing of said brake actuating mechanism; the combination therewith of a lubricating installation comprising an inlet carried by the support, passageways conducting said lubricant into the pivotal mount to lubricate the same, and overflow conduits from said pivotal mount leading to said brake bearing and from said brake bearing to said steering bearing.

58. A king pin construction adapted to have its protruding ends serve as pivotal bearings and received within the upper and lower clevis jaws of a steering knuckle, and also adapted to be encircled by a thrust bearing between the upper and lower clevis jaws, said king pin having a central bore extending from the upper end thereof to substantially the lower end thereof, but stopping short of said lower end, said bore being of enlarged diameter adjacent its upper end, a standpipe mounted in said bore so as to form an annular overflow inlet chamber of said portion of enlarged diameter and a plurality of radial bores communicating with said central bore, one of said radial bores serving as an inlet to the bottom of the inlet chamber and the other radial bores being positioned at the thrust bearing and at the lower pivotal bearing to convey lubricant which has overflowed into the central bore from the annular chamber respectively into the thrust bearing and the lower king pin bearing.

JOSEPH BIJUR.